(12) United States Patent
Yang (10) Patent No.: US 11,504,847 B2
(45) Date of Patent: Nov. 22, 2022

(54) DISTRIBUTED ROBOT SCHEDULING DECISION METHOD, APPARATUS AND SYSTEM, ELECTRONIC DEVICE AND STORAGE MEDIUM

(71) Applicant: SYRIUS ROBOTICS CO., LTD., Guangdong (CN)

(72) Inventor: Zhiqin Yang, Guangdong (CN)

(73) Assignee: SYRIUS ROBOTICS CO., LTD., Guangdong (CN)

(*) Notice: Subject to any disclaimer, the term of this patent is extended or adjusted under 35 U.S.C. 154(b) by 63 days.

(21) Appl. No.: 17/294,428

(22) PCT Filed: Dec. 29, 2018

(86) PCT No.: PCT/CN2018/125150
§ 371 (c)(1),
(2) Date: May 17, 2021

(87) PCT Pub. No.: WO2020/103298
PCT Pub. Date: May 28, 2020

(65) Prior Publication Data
US 2022/0016771 A1  Jan. 20, 2022

(30) Foreign Application Priority Data
Nov. 19, 2018 (CN) .......................... 201811371589.0

(51) Int. Cl.
*B25J 9/16* (2006.01)
*B25J 13/00* (2006.01)

(52) U.S. Cl.
CPC ........... *B25J 9/1661* (2013.01); *B25J 9/1682* (2013.01); *B25J 13/006* (2013.01)

(58) Field of Classification Search
CPC ...... B25J 9/1661; B25J 9/1682; B25J 13/006; G05B 2219/31002; G05B 19/41895; Y02P 90/02; Y02P 90/60
See application file for complete search history.

(56) References Cited

U.S. PATENT DOCUMENTS 9,821,455 B1 * 11/2017 Bareddy .................. H04N 7/15
2008/0109114 A1   5/2008 Orita et al.
(Continued)

FOREIGN PATENT DOCUMENTS

JP    2005313303 A    11/2005
JP    2006106919 A    4/2006
(Continued)

*Primary Examiner* — Basil T. Jos
(74) *Attorney, Agent, or Firm* — Gang Yu (57) ABSTRACT

Provided is a distributed robot scheduling decision method. The method includes: a task pack including at least one task is received, and the task pack is transmitted to other robots in swarm robots (S10); a decision is made according to a claiming decision variable to claim a task suitable for execution in the task pack (S11); and the task suitable for execution is executed (S12). In such a manner, swarm robots may communicate with one another for task transmission and make decisions according to claiming decision variables to claim tasks suitable for execution in the task pack for execution. Therefore, a technical effect that the swarm robots may make decisions independently rather than in centralized decision and central control decision manners to effectively avoid overloading a server at a high possibility is achieved, and moreover, a technical effect of intelligently selecting tasks for execution to improve the execution efficiency is achieved.

13 Claims, 3 Drawing Sheets

(56) References Cited

U.S. PATENT DOCUMENTS

| | | | | |
|---|---|---|---|---|
| 2016/0129592 A1* | 5/2016 | Saboo | ............. | B25J 9/1661 |
| | | | | 700/248 |
| 2017/0113352 A1* | 4/2017 | Lutz | ............. | G05D 1/0291 |
| 2018/0311822 A1* | 11/2018 | Kam | ............. | B25J 9/162 |

FOREIGN PATENT DOCUMENTS

| | | | |
|---|---|---|---|
| JP | 2007242056 A | 9/2007 | |
| JP | 2017059217 A | 3/2017 | |
| JP | 2018073367 A | 5/2018 | |
| WO | 2017212987 A1 | 12/2017 | |

* cited by examiner

DISTRIBUTED ROBOT SCHEDULING DECISION METHOD, APPARATUS AND SYSTEM, ELECTRONIC DEVICE AND STORAGE MEDIUM

CROSS-REFERENCE TO RELATED APPLICATIONS

The present disclosure claims priority to Chinese patent application No. 201811371589.0 filed to the China Patent Office on Nov. 19, 2018, the disclosure of which is hereby incorporated by reference in its entirety.

TECHNICAL FIELD

The disclosure relates to the technical field of swarm robots control, and particularly to a distributed robot scheduling decision method, apparatus and system, an electronic device and a storage medium.

BACKGROUND

In the field of goods circulation, an Auto Guided Vehicle (AGV) scheduling decision system consisting of a central control server and multiple AGVs is often used to receive, transport and unload goods to implement logistics management. The central control server schedules the multiple AGVs in a unified manner and makes decisions about actions of the AGVs, thereby achieving a purpose of logistics management.

Although the existing AGV scheduling decision system may achieve the purpose of logistics management, the AGVs cannot communicate with one another, and thus the central control server may be overloaded at a high possibility.

Since the AGVs have no calculation capabilities but only motion control capabilities, the central control server is required by both path selection and action planning of the AGVs. Since swarm AGVs form a structure like a "star" topology structure, namely each AGV is connected with the central control server, request bombing from the swarm AGVs overloads the central control server and makes it impossible to implement unified scheduling decision. In addition, since the AGVs have no calculation capabilities and the AGVs cannot communicate with one another, if the central control server fails, the swarm AGVs may systematically crash.

In summary, the existing AGV scheduling decision system has the technical problem that the AGVs cannot communicate with one another and thus the central control server may be overloaded at a high possibility.

SUMMARY

In view of this, the disclosure is intended to provide a distributed robot scheduling decision method, apparatus and system, an electronic device and a storage medium, to solve the technical problem of an AGV scheduling decision system that AGVs cannot communicate with one another and thus a central control server may be overloaded at a high possibility.

In order to solve the above technical problem, the embodiments of the present disclosure provide a distributed robot scheduling decision method, which includes that:

a task pack including at least one task is received, and the task pack is transmitted to other robots in swarm robots;

a decision is made according to a claiming decision variable to claim a task suitable for execution in the task pack; and the task suitable for execution is executed.

The embodiments of the present disclosure also provide an electronic device, which includes a memory and a processor, wherein the memory stores a computer program, and the computer program is executed in the processor to implement any abovementioned method.

The embodiments of the present disclosure also provide a storage medium, which stores a computer program, wherein the computer program is executed in a processor to implement any abovementioned method.

The embodiments of the present disclosure also provide a distributed robot scheduling decision system, which includes:

swarm robots, including at least two robots, the robots communicating with each other through a communication interface; and a server, communicating with the swarm robots and configured to transmit a task pack including at least one task to any robot in the swarm robots for transmission to the other robots;

wherein the swarm robot makes a decision according to a claiming decision variable to claim a task suitable for execution in the task pack and executes the task suitable for execution.

The embodiments of the present disclosure also provide a distributed robot scheduling decision apparatus, which includes:

a receiving and transmission module, configured to receive a task pack including at least one task and transmit the task pack to other robots in swarm robots;

a decision claiming module, configured to make a decision according to a claiming decision variable to claim a task suitable for execution in the task pack; and an execution module, configured to execute the task suitable for execution.

According to the distributed robot scheduling decision method provided in the above embodiments of the present disclosure, the task pack including the at least one task is received, the task pack is transmitted to the other robots in the swarm robots, then the decision is made according to the claiming decision variable to claim the task suitable for execution in the task pack, and the task suitable for execution is executed. In such a manner, the swarm robots may communicate with one another for task transmission and make decisions according to claiming decision variables to claim tasks suitable for execution in the task pack for execution. Therefore, a technical effect that the swarm robots may make decisions independently rather than in centralized decision and central control decision manners to effectively avoid overloading a server at a high possibility is achieved, and moreover, a technical effect of intelligently selecting tasks for execution to improve the execution efficiency is achieved.

DETAILED DESCRIPTION OF THE EMBODIMENTS

In order to make the objectives, technical solutions and advantages of the disclosure clearer, the following further describes the disclosure in detail with reference to the drawings and embodiments. It should be understood that, in the descriptions of the disclosure, unless otherwise clearly specified and limited, term "storage medium" may be various media capable of storing computer programs, such as a Read-Only Memory (ROM), a Random Access Memory (RAM), a magnetic disk, or an optical disk. Term "processor" may be a chip or circuit with a data processing function, such as a Complex Programmable Logic Device (CPLD), a Field-Programmable Gate Array (FPGA), a Microcontroller Unit (MCU), a Programmable Logic Controller (PLC), and a Central Processing Unit (CPU). Term "electronic device" may be any device with the data processing function and a storage function, and may usually include a fixed terminal and a mobile terminal. The fixed terminal is, for example, a desktop computer. The mobile terminal is, for example, a mobile phone, a PAD, and a mobile robot. In addition, the technical features involved in different implementation modes of the disclosure described later can be combined with each other as long as they do not conflict with each other.

In the following, the disclosure proposes some preferred embodiments to teach those skilled in the art to implement.

In order to highlight an innovation of the disclosure and help those skilled in the art understand the disclosure, before the specific implementation modes of disclosure are described, a conventional art closest to the disclosure is introduced at first. The disclosure is created by intelligence contribution based on the closest conventional art.

In the field of goods circulation, an AGV scheduling decision system consisting of a central control server and multiple AGVs is often used to receive, transport and unload goods to implement logistics management. The central control server schedules the multiple AGVs in a unified manner and makes decisions about actions of the AGVs, thereby achieving a purpose of logistics management.

Although the existing AGV scheduling decision system may implement logistics management, the AGVs cannot communicate with one another, and thus the central control server may be overloaded at a high possibility.

Since the AGVs have no calculation capabilities but only motion control capabilities, the central control server is required by both path selection and action planning of the AGVs. Since swarm AGVs form a structure like a "star" topology structure, namely each AGV is connected with the central control server, request bombing from the swarm AGVs overloads the central control server and makes it impossible to implement unified scheduling decision. In addition, since the AGVs have no calculation capabilities and the AGVs cannot communicate with one another, if the central control server fails, the swarm AGVs may systematically crash.

In summary, the existing AGV scheduling decision system has the technical field that the AGVs cannot communicate with one another and thus the central control server may be overloaded at a high possibility. The technical problem can also be understood as a defect of centralized decision and central control.

Figure 1:
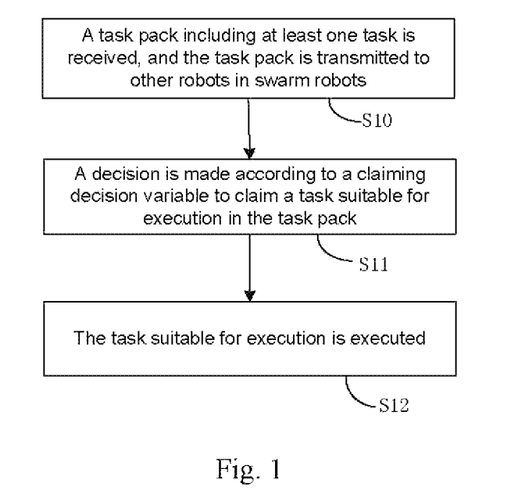
FIG. 1 is a flowchart of a distributed robot scheduling decision method according to an embodiment of the present disclosure.

FIG. 1 is a flowchart of a distributed robot scheduling decision method according to, an embodiment, and shows a distributed robot scheduling decision method, which is used to solve the above technical problem.

Referring to FIG. 1, a distributed robot scheduling decision method includes the following steps.

In S10, a task pack including at least one task is received, and the task pack is transmitted to other robots in swarm robots.

In S11, a decision is made according to a claiming decision variable to claim a task suitable for execution in the task pack.

In S12, the task suitable for execution is executed.

In the embodiment, the task pack including the at least one task is received, the task pack is transmitted to the other robots in the swarm robots, then the decision is made according to the claiming decision variable to claim the task suitable for execution in the task pack, and the task suitable for execution is executed. In such a manner, the swarm robots may communicate with one another for task transmission and make decisions according to claiming decision variables to claim tasks suitable for execution in the task pack for execution. Therefore, a technical effect that the swarm robots may make decisions independently rather than in centralized decision and central control decision manners to effectively avoid overloading a server at a high possibility is achieved, and moreover, a technical effect of intelligently selecting tasks for execution to improve the execution efficiency is achieved.

It is to be noted that the distributed robot scheduling decision method provided in the embodiment may be used to schedule swarm robots in any field to execute tasks. Preferably, the method may be used to schedule logistics swarm robots to execute tasks in the field of logistics. Furthermore, the method may be used to schedule logistics swarm robots to execute tasks in logistics warehouses.

It is to be noted that the swarm robots include, but not limited to, two robots. Each robot may be a minicomputer centered mobile robot with an autonomous calculation capability and an autonomous navigation capability. In addition, multiple communication interfaces may be installed in each robot, and each robot may communicate with another robot through one communication interface thereof and a communication interface of the other robot.

It is also to be noted that the task pack is a data packet including at least one task and the data packet may be transmitted through a network. That the task pack includes the at least one task can be understood as that the task, pack is a task group, and the task group may include a navigation task, a moving task, a picking task, a prompting task, etc.

It is also to be noted that the multiple communication interfaces may include a Wireless Fidelity (WiFi) network interface and a 4th-Generation (4G) Internet of Things (IoT) network interface. The WiFi network interface may be configured to connect the multiple robots for communication. In addition, the 4G IoT network interface may be configured to connect the server with any one of the multiple robots for communication.

It is also to be noted that, in S10, any one of the swarm robots receives the task pack including the at least one task from the server and then transmits the task pack to the other robots in the swarm robots.

A transmission manner may be broadcast transmission or point-to-point transmission. In the embodiment, point-to-point transmission is preferred for transmission of the task pack. For example, after transmitted to one of the swarm robots by the server, the task pack is transmitted to the robots receiving the task pack later by the robots receiving the task pack earlier, and the task pack is sequentially transmitted in such a manner until received by all the swarm robots.

In addition, the swarm robots receive and then respectively store the task pack, and in such case, a task state of the task pack received by each robot is completely the same.

It is also to be noted that, in S11 and S12, the claiming decision variable includes, but not limited to, a stopped state, working state, present position state, own vehicle or container, power state, task load state of claimed tasks and task load state of tasks to be claimed of the robot.

In addition, for the task suitable for execution, the robot judges whether a task content in the task pack is relatively suitable for the robot to claim and execute or not according to the claiming decision variable. For example, a task content read by one robot in the swarm robots in the task pack is go to a nearby picking point to pick, goods. In such case, the robot extracts its own present position, judges whether a distance between its present position and the nearby picking point exceeds a threshold or not, if NO, determines that the task is suitable for the robot to claim and execute.

Moreover, all the swarm robots claim tasks suitable for the robots to claim and execute for execution according to their own decision variables, so that the technical effect that the swarm robots may make decisions independently rather than in the centralized decision and central control decision manners to effectively avoid overloading the server at a high possibility is achieved, and moreover, the technical effect of intelligently selecting tasks for execution to improve the execution efficiency is achieved.

Figure 2:
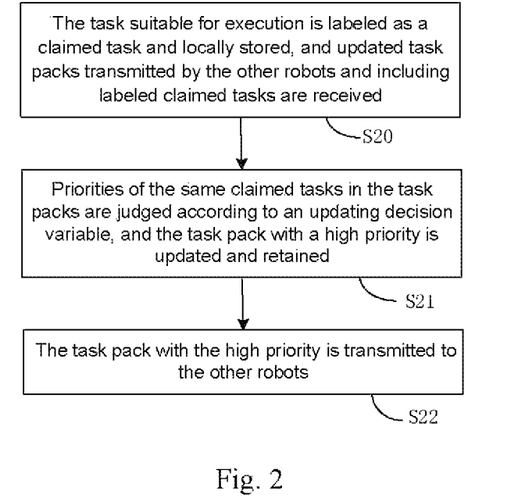
FIG. 2 is a flowchart of an improved method of the method in FIG. 1 according to an embodiment of the present disclosure.

FIG. 2 is a flowchart of an improved method of the method in FIG. 1 according to an embodiment, and shows an improved method of a distributed robot scheduling decision method, which is used to solve the technical problem of task execution conflicts.

Referring to FIG. 2, the method in FIG. 1 further includes the following steps.

In S20, the task suitable for execution is labeled as a claimed task and locally stored, and updated task packs transmitted by the other robots and including labeled claimed tasks are received.

In S21, priorities of the same claimed tasks in the task packs are judged according to an updating decision variable, and the task pack with a high priority is updated and retained.

In S22, the task pack with the high priority is transmitted to the other robots.

In the embodiment, the task suitable for execution is labeled as the claimed task and locally stored, then the updated task packs transmitted by the other robots and including the labeled claimed tasks are received, the priorities of the same claimed tasks in different task packs are judged according to the updating decision variable, the task pack with the high priority is updated and retained, and the task pack with the high priority is transmitted to the other robots, so that a technical effect of solving task execution conflicts by priority judgment is achieved.

It is to be noted that, since all the swarm robots claim the tasks suitable for the robots to claim and execute for execution according to their own decision variables, under the condition that at least two of the swarm robots make a decision to claim the same task content, for example, any three robots claim the task of going to the nearby picking point to pick the goods, there may be a task execution conflict.

It is also to be noted that, in S20, since each robot in the swarm robots labels a task, claimed by the robot as a claimed task and transmits the task pack including the labeled claimed task to the other robots, each robot stores its own task pack including the labeled claimed task (for convenient description, the "own task pack including the labeled claimed task" is called a local claimed task pack for short) and the task packs transmitted by the other robots and including the labeled tasks (for convenient description, the "task packs transmitted by the other robots and including the labeled claimed tasks" are called transmitted claimed task packs for short).

It is also to be noted that, in S21 and S22, the updating decision variable includes, but not limited to, the present position state, power state and task claiming time of the robot.

In addition, the different task packs refer to the local claimed task pack and the transmitted claimed task packs.

Moreover, the priorities of the same claimed tasks in the different task packs are judged according to the updating decision variable, and the task pack with the high priority is updated and retained. For example, if task T1 is labeled to be claimed in all the local claimed task pack and the transmitted claimed task pack, priority judgment may be performed through, but not limited to, the following updating decision variables.

First, the priorities are judged through the task claiming time.

It is assumed that a robot reads claiming time t1 of task T1 in the local claimed task pack sand claiming time t2 of task T1 in a transmitted claimed task pack. If t1 is earlier than t2, it may be judged that a priority of task T1 claimed later is higher than a priority of task T1 claimed earlier.

Second, the priorities are judged through the present position state.

It is assumed that a robot reads a travel s1 between a present position thereof and execution of task T1 and a travel s2 between a present position of another robot and execution of task T1. If s1 is greater than s2, it may be judged that a priority of task T1 in the transmitted claimed task pack is high.

In addition, the task pack with the high priority is updated and retained, and then the task pack with the high priority is transmitted to the other robots. In such a manner, decision priorities may be judged one by one to determine a final completion condition of execution of task T1 by a certain robot, not only are task execution conflicts avoided, but also a technical effect of optimizing a resource configuration is achieved. A transmission manner may be broadcast transmission or point-to-point transmission. In the embodiment, point-to-point transmission is preferred for transmission of the task pack. For example, the task pack is transmitted from one robot to another robot and then transmitted from the another robot to another robot, and the task pack is sequentially transmitted in such a manner until finally received by all the swarm robots.

Figure 3:
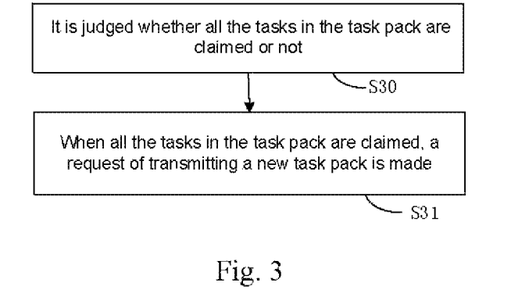
FIG. 3 is a flowchart of an improved method, of the method in FIG. 2 according to an embodiment of the present disclosure.

FIG. 3 is a flowchart of an improved method of the method in FIG. 2 according to an embodiment, and shows an improved method of a distributed robot scheduling decision method, which is used to solve the technical problem of how to acquire a new task pack from the server.

Referring to FIG. 3, the method in FIG. 2 further includes the following steps.

In S30, it is judged whether all the tasks in the task pack are claimed or not.

In S31, when all the tasks in the task pack are claimed, a request of transmitting a new task pack is made.

In the embodiment, it is judged whether all the tasks in the task pack are claimed or not, and when all the tasks are claimed, the request of transmitting the new task pack is made to the server, so that a technical effect of controlling the swarm robots to keep working is achieved.

It is to be noted that, in S30 and S31, any robot in the swarm robots, if all tasks in a transmitted claimed task pack received by the robot are labeled to be claimed, judges that all the tasks in the task pack are claimed, and in such case, the robot may transmit the transmitted claimed task pack to the other robots by broadcast transmission or point-to-point transmission until the data pack is transmitted to the robot communicating with the server, to communicate with the server to make a request of transmitting a new data pack, so that the technical effect of controlling the swarm robots to keep working is achieved.

Figure 4:
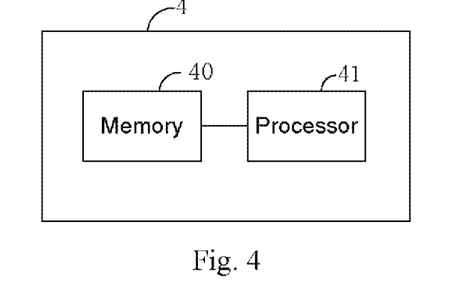
FIG. 4 is a structural diagram of an electronic device according to an embodiment of the present disclosure.

FIG. 4 is a structural diagram of an electronic device according to an embodiment, and shows an electronic device, which is configured to store and process a computer program.

Referring to FIG. 4, an electronic device includes a memory and a processor, wherein the memory stores the computer program, and the computer program is executed in the processor to implement any method shown in FIG. 1 to FIG. 3.

In an embodiment, there is also provided a storage medium, which stores a computer program, wherein the computer program is executed in a processor to implement any method in shown FIG. 1 to FIG. 3.

Figure 5:
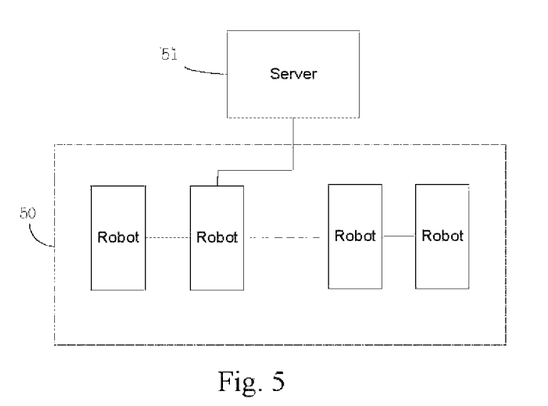
FIG. 5 is a structural diagram of a distributed robot scheduling decision system according to an embodiment of the present disclosure.

FIG. 5 is a structural diagram of a distributed robot scheduling decision system according to an embodiment, and shows a distributed robot scheduling decision system. The distributed robot scheduling decision system includes:

swarm robots 50, including at least two robots, the robots communicating with one another through a communication interface; and a server 51, communicating with the swarm robots 50 and configured to transmit a task pack including at least one task to any robot in the swarm robots 50 for transmission to the other robots, wherein the swarm robot 50 makes a decision according to a claiming decision variable to claim a task suitable for execution in the task pack and executes the task suitable for execution.

In the embodiment, the task pack including the at least one task is received, the task pack is transmitted to the other robots in the swarm robots 50, then the decision is made according to the claiming decision variable to claim the task suitable for execution in the task pack, and the task suitable for execution is executed. In such a manner, the swarm robots 50 may communicate with one another for task transmission and make decisions according to claiming decision variables to claim tasks suitable for execution in the task pack for execution. Therefore, a technical effect that the swarm robots 50 may make decisions independently rather than in centralized decision and central control decision manners to effectively avoid overloading a server at a high possibility is achieved, and moreover, a technical effect of intelligently selecting tasks for execution to improve the execution efficiency is achieved.

It is to be noted that the distributed robot scheduling decision method provided in the embodiment may be used to schedule swarm robots 50 in any field to execute tasks. Preferably, the method may be used to schedule logistics swarm robots 50 to execute tasks in the field of logistics. Furthermore, the method may be used to schedule logistics swarm robots 50 to execute tasks in logistics warehouses.

It is to be noted that the swarm robots 50 include, but not limited to, two robots. Each robot may be a minicomputer centered mobile robot with an autonomous calculation capability and an autonomous navigation capability. In addition, multiple communication interfaces may be installed in each robot, and each robot may communicate with another robot through one communication interface thereof and a communication interface of the other robot.

It is also to be noted that the task pack is a data packet including at least one task and the data packet may be transmitted through a network. That the task pack includes the at least one task can be understood as that the task pack is a task group, and the task group may include a navigation task, a moving task, a picking task, a prompting task, etc.

It is also to be noted that the multiple communication interfaces may include a WiFi network interface and a 4G IoT network interface. The WiFi network interface may be configured to connect the multiple robots for communication. In addition, the 4G IoT network interface may be configured to connect the server 51 with any one of the multiple robots for communication.

It is also to be noted that any one of the swarm robots 50 receives the task pack including the at least one task from the server 51 and then transmits the task pack to the other robots in the swarm robots 50.

A transmission manner may be broadcast transmission or point-to-point transmission. In the embodiment, point-to-point transmission is preferred for transmission of the task pack. For example, after transmitted to one of the swarm robots 50 by the server, the task pack is transmitted to the robots receiving the task pack later by the robots receiving the task pack earlier, and the task pack is sequentially transmitted in such a manner until received by all the swarm robots 50.

In addition, the swarm robots 50 receive and then respectively store the task pack, and in such case, a task state of the task pack received by each robot is completely the same.

It is also to be noted that the claiming decision variable includes, but not limited to, a stopped state, working state, present position state, own vehicle or container, power state, task load state of claimed tasks and task load state of tasks to be claimed of the robot.

In addition, for the task suitable for execution, the robot judges whether a task content in the task pack is relatively suitable for the robot to claim and execute or not according to the claiming decision variable. For example, a task content read by one robot in the swarm robots 50 in the task pack is go to a nearby picking point to pick goods. In such case, the robot extracts its own present position, judges whether a distance between its present position and the nearby picking point exceeds a threshold or not, if NO, determines that the task is suitable for the robot to claim and execute.

Moreover, all the swarm robots 50 claim tasks suitable for the robots to claim and execute for execution according to their own decision variables, so that the technical effect that the swarm robots 50 may make decisions independently rather than in the centralized decision and central control decision manners to effectively avoid overloading the server at a high possibility is, achieved, and moreover, the technical effect of intelligently selecting tasks for execution to improve the execution efficiency is achieved.

Figure 6:
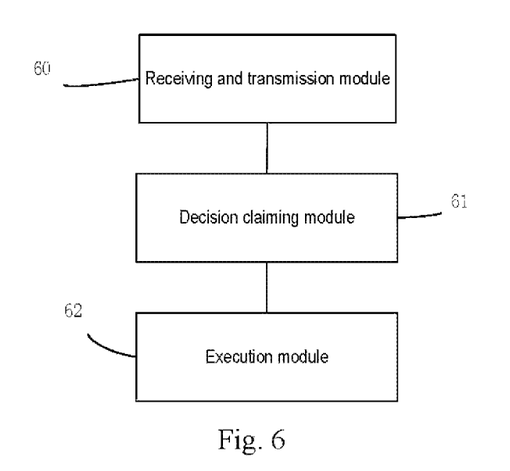
FIG. 6 is a structural diagram of a distributed robot scheduling decision apparatus according to an embodiment of the present disclosure.

FIG. 6 is a structural diagram of a distributed robot scheduling decision apparatus according to an embodiment, and shows a distributed robot scheduling decision apparatus. The distributed robot scheduling decision apparatus includes:

a receiving and transmission module 60, configured to receive a task pack including at least one task and transmit the task pack to other robots in swarm robots;

a decision claiming module 61, configured to make a decision according to a claiming decision variable to claim a task suitable for execution in the task pack; and an execution module 62, configured to execute the task suitable for execution.

In the embodiment, the task pack including the at least one task is received, the task pack is transmitted to the other robots in the swarm robots, then the decision is made according to the claiming decision variable to claim the task suitable for execution in the task pack, and the task suitable for execution is executed. In such a manner, the swarm robots may communicate with one another for task transmission and make decisions according to claiming decision variables to claim tasks suitable for execution in the task pack for execution. Therefore, a technical effect that the swarm robots may make decisions independently rather than in centralized decision and central control decision manners to effectively avoid overloading a server at a high possibility is achieved, and moreover, a technical effect of intelligently selecting tasks for execution to improve the execution efficiency is achieved.

It is to be noted that the distributed robot scheduling decision method provided in the embodiment may be used to schedule swarm robots in any field to execute tasks. Preferably, the method may be used to schedule logistics swarm robots to execute tasks in the field of logistics. Furthermore, the method may be used to schedule logistics swarm robots to execute tasks in logistics warehouses.

It is to be noted that the swarm robots include, but not limited to, two robots. Each robot may be a minicomputer centered mobile robot with an autonomous calculation capability and an autonomous navigation capability. In addition, multiple communication interfaces may be installed in each robot, and each robot may communicate with another robot through one communication interface thereof and a communication interface of the other robot.

It is also to be noted that the task pack is a data packet including at least one task and the data packet may be transmitted through a network. That the task pack includes the at least one task can be understood as that the task pack is a task group, and the task group may include a navigation task, a moving task, a picking task, a prompting task, etc.

It is also to be noted that the multiple communication interfaces may include a WiFi network interface and a 4G IoT network interface. The WiFi network interface may be configured to connect the multiple robots for communication. In addition, the 4G IoT network interface may be configured to connect the server with any one of the multiple robots for communication.

It is also to be noted that any one of the swarm robots receives the task pack including the at least one task from the server and then transmits the task pack to the other robots in the swarm robots.

A transmission manner may be broadcast transmission or point-to-point transmission. In the embodiment, point-to-point transmission is preferred for transmission of the task pack. For example, after transmitted to one of the swarm robots by the server, the task pack is transmitted to the robots receiving the task pack later by the robots receiving the task pack earlier, and the task pack is sequentially transmitted in such a manner until received by all the swarm robots.

In addition, the swarm robots receive and then respectively store the task pack, and in such case, a task state of the task pack received by each robot is completely the same.

It is also to be noted that the claiming decision variable includes, but not limited to, a stopped state, working state, present position state, own vehicle or container, power state, task load state of claimed tasks and task load state of tasks to be claimed of the robot.

In addition, for the task suitable for execution, the robot judges whether a task content in the task pack is relatively suitable for the robot to claim and execute or not according to the claiming decision variable. For example, a task content read by one robot in the swarm robots in the task pack is go to a nearby picking point to pick goods. In such case, the robot extracts its own present position, judges whether a distance between its present position and the nearby picking point exceeds a threshold or not, if NO, determines that the task is suitable for the robot to claim and execute.

Moreover, all the swarm robots claim tasks suitable for the robots to claim and execute for execution according to their own decision variables, so that the technical effect that the swarm robots may make decisions independently rather than in the centralized decision and central control decision manners to effectively avoid overloading the server at a high possibility is achieved, and moreover, the technical effect of intelligently selecting tasks for execution to improve the execution efficiency is achieved.

Figure 7:
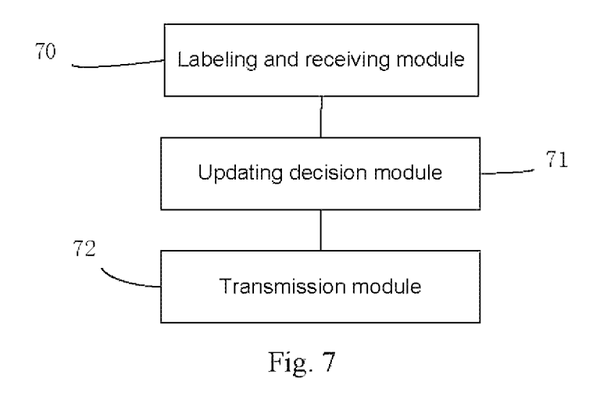
FIG. 7 is a structural diagram of an improved apparatus of the apparatus in FIG. 6.

FIG. 7 is a structural diagram of an improved apparatus of the apparatus in FIG. 6, and shows an improved distributed robot scheduling decision apparatus.

Referring to FIG. 7, the distributed robot scheduling decision apparatus in FIG. 6 further includes:

a labeling and receiving module 70, configured to label the task suitable for execution as a claimed task and locally store the claimed task and receive updated task packs transmitted by the other robots and including labeled claimed tasks;

an updating decision module 71, configured to judge priorities of the same claimed tasks in the different task packs according to the updating decision variable and update and retain the task pack with the high priority; and a transmission module 72, configured to transmit the task pack with the high priority to the other robots.

In the embodiment, the task suitable for execution is labeled as the claimed task and locally stored, then the updated task packs transmitted by the other robots and including the labeled claimed tasks are received, the priorities of the same claimed tasks in different task packs are judged according to the updating decision variable, the task pack with the high priority is updated and retained, and the task pack with the high priority is transmitted to the other robots, so that a technical effect of solving task execution conflicts by priority judgment is achieved.

It is to be noted that, since all the swarm robots claim the tasks suitable for the robots to claim and execute for execution according to their own decision variables, under the condition that at least two of the swarm robots make a decision to claim the same task content, for example, any three robots claim the task of going to the nearby picking point to pick the goods, there may be a task execution conflict.

It is also to be noted that, since each robot in the swarm robots labels a task claimed by the robot as a claimed task and transmits the task pack including the labeled claimed task to the other robots, each robot stores its own task pack including the labeled claimed task (for convenient description, the "own task pack including the labeled claimed task" is called a local claimed task pack for short) and the task packs transmitted by the other robots and including the labeled tasks (for convenient description, the "task packs transmitted by the other robots and including the labeled claimed tasks" are called transmitted claimed task packs for short).

It is also to be noted that the updating decision variable includes, but not limited to, the present position state, power state and task claiming time of the robot.

In addition, the different task packs refer to the local claimed task pack and the transmitted claimed task packs.

Moreover, the priorities of the same claimed tasks in the different task packs are judged according to the updating decision variable, and the task pack with the high priority is updated and retained. For example, if task T1 is labeled to be claimed in all the local claimed task pack and the transmitted claimed task pack, priority judgment may be performed through, but not limited to, the following updating decision variables.

First, the priorities are judged through the task claiming time.

It is assumed that a robot reads claiming time t1 of task T1 in the local claimed task, pack sand claiming time t2 of task T1 in a transmitted claimed task pack. If t1 is earlier than t2, it may be judged that, a priority of task T1 claimed later is higher than a priority of task T1 claimed earlier.

Second, the priorities are judged through the present position state.

It is assumed that a robot reads, a travel s1 between a present position thereof and execution of task T1 and a travel s2 between a present position of another robot and execution of task T1. If s1 is greater than s2, it may be judged that a priority of task T1 in the transmitted claimed task pack is high.

In addition, the task pack with the high priority is updated and retained, and then the task pack with the high priority is transmitted to the other robots. In such a manner, decision priorities may be judged one by one to determine a final completion condition of execution of task T1 by a certain robot, not only are task execution conflicts avoided, but also a technical effect of optimizing a resource configuration is achieved. A transmission manner may be broadcast transmission or point-to-point transmission. In the embodiment, point-to-point transmission is preferred for transmission of the task pack. For example, the task pack is transmitted from one robot to another robot, and then transmitted from the another robot to another robot, and the task pack is sequentially transmitted in such a manner until finally received by all the swarm robots.

Figure 8:
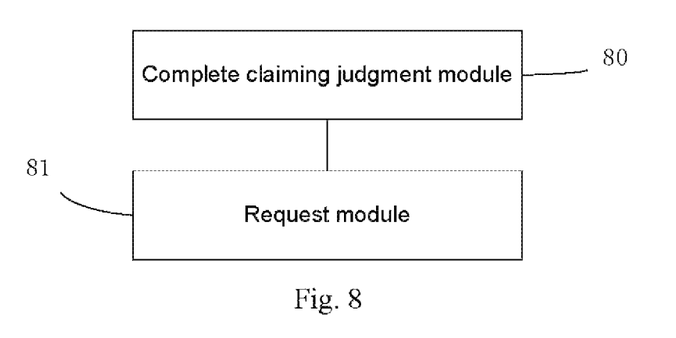
FIG. 8 is a structural diagram of an improved apparatus of the apparatus in FIG. 7.

FIG. 8 is a structural diagram of an improved apparatus of the apparatus in FIG. 7, and shows an improved distributed robot scheduling decision apparatus.

Referring to FIG. 8, the distributed robot scheduling decision apparatus in FIG. 7 further includes:

a complete claiming judgment module 80, configured to judge whether all the tasks in the task pack are claimed or not; and a request module 81, configured to make a request of transmitting a new task pack according to a judgment result that all the tasks in the task pack are claimed.

In the embodiment, it is judged whether all the tasks in the task pack are claimed or not, and when all the tasks are claimed, the request of transmitting the new task pack is made to the server, so that a technical effect of controlling the swarm robots to keep working is achieved.

It is to be noted that, in S31 and S31, any robot in the swarm robots, if all tasks in a transmitted claimed task pack received by the robot are labeled to be claimed, judges that all the tasks in the task pack are claimed, and in such case, the robot may transmit the transmitted claimed task pack to the other robots by broadcast transmission or point-to-point transmission until the data pack is transmitted to the robot communicating with the server, to communicate with the server to make a request of transmitting a new data pack, so that the technical effect of controlling the swarm robots to keep working is achieved.

The above descriptions are only the preferred embodiments of the disclosure and are not intended to limit the disclosure. Any modification, equivalent replacement and improvement made within the spirit and principle of the disclosure, shall be included in the protection scope of the disclosure.

INDUSTRIAL APPLICABILITY

According to the distributed robot scheduling decision method provided in the embodiments of the disclosure, the task pack including the at least one task is received, the task pack is transmitted to the other robots in the swarm robots, then the decision is made according to the claiming decision variable to claim the task suitable for execution in the task pack, and the task suitable for execution is executed. In such a manner, the swarm robots may communicate with one another for task transmission and make decisions according to claiming decision variables to claim tasks suitable for execution in the task pack for execution. Therefore, a technical effect that the swarm robots may make decisions independently rather than in centralized decision and central control decision manners to effectively avoid overloading a server at a high possibility is achieved, and moreover, a technical effect of intelligently selecting tasks for execution to improve the execution efficiency is achieved.

What is claimed is:

1. A distributed swarm robot scheduling decision method, at least comprises two swarm robots, and the swarm robots communicating with each other through a communication interface, the swarm robots, comprising:

receiving a task pack comprising at least one task, and transmitting the task pack to other swarm robots, and a task state of the task pack received by each swarm robot is the same;

making a decision to claim a task suitable for execution in the task pack according to a claiming decision variable; and executing the task suitable for execution;

labeling the task suitable for execution as a claimed task and locally storing the claimed task, and receiving updated task packs transmitted by the other swarm robots and comprising labeled claimed tasks;

judging priorities of the same claimed tasks in different task packs according to an updating decision variable, and updating and retaining the task pack with a high priority; and transmitting the task pack with the high priority as updated task packs comprising labeled claimed tasks to the other swarm robots.

2. The method according to claim 1, further comprising: judging whether all the tasks in the task pack are claimed or not; and when all the tasks in the task pack are claimed, making, a request of transmitting a new task pack.

3. An electronic device, comprising a memory and a processor, wherein the memory stores a computer program, and the computer program is executed by the processor to implement the method as claimed in claim 2.

4. A non-transitory storage medium, storing a computer program, wherein the computer program is executed by a processor to implement the method as claimed in claim 2.

5. The method according to claim 1, wherein the claiming decision variable comprises stopped or working states of the swarm robot, and/or a present position state of the swarm robot, and/or an own vehicle and container of the swarm robot, and/or a task load of claimed tasks or tasks to be claimed of the swarm robot.

6. An electronic device, comprising a memory and a processor, wherein the memory stores a computer program, and the computer program is executed by the processor to implement the method as claimed in claim 5.

7. The method according to claim 1, wherein the updating decision variable comprises the present position state of the swarm robot, and/or a power state of the swarm robot, and/or task claiming time.

8. An electronic device, comprising a memory and a processor, wherein the memory stores a computer program, and the computer program is executed by the processor to implement the method as claimed in claim 7.

9. An electronic device, comprising a memory and a processor, wherein the memory stores a computer program, and the computer program is executed by the processor to implement the method as claimed in claim 1.

10. A non-transitory storage medium, storing a computer program, wherein the computer program is executed by a processor to implement the method as claimed in claim 1.

11. A distributed swarm robot scheduling decision system, comprising:

swarm robots, comprising at least two swarm robots, the swarm robots communicating with each other through a communication interface; and a server, communicating with the swarm robots and configured to transmit a task pack comprising at least one task to any one of swarm robots for transmission to the other robots, wherein a task state of the task pack received by each swarm robot is the same, the swarm robots make a decision to claim a task suitable for execution in the task pack according to a claiming decision variable and executes the task suitable for execution;

each of the robots is further configured to:

judge whether all the tasks in the task pack are claimed or not; and when all the tasks in the task pack are claimed, make a request of transmitting a new task pack.

12. A distributed swarm robot scheduling decision apparatus, at least comprises two swarm robots, and the robots communicating with each other through a communication interface, the swarm robots comprising:

a receiving and transmission module, configured to receive a task pack comprising at least one task and transmit the task pack to other swarm robots in swarm robots, a task state of the task pack received by each swarm robot is the same;

a decision claiming module, configured to make a decision to claim a task suitable for execution in the task pack according to a claiming decision variable; and an execution module, configured to execute the task suitable for execution;

a labeling and receiving module, configured to label the task suitable for execution as a claimed task and locally store the claimed task and receive updated task packs transmitted by the other swarm robots and comprising labeled claimed tasks;

an updating decision module, configured to judge priorities of the same claimed tasks in the different task packs according to the updating decision variable and update and retain the task pack with the high priority;

a transmission module, configured to transmit the task pack with the high priority to the other swarm robots.

13. The apparatus according to claim 12, further comprising:

a complete claiming judgment, module, configured to judge whether all the tasks in the task pack are claimed or not; and a request module, configured to make a request of transmitting a new task pack according to a judgment result that all the tasks in the task pack are claimed.

* * * * *